Jan. 10, 1961 R. D. PAGE 2,967,596
LOCKING MECHANISM FOR POWER TRANSMISSION
Filed Jan. 5, 1959 2 Sheets-Sheet 2

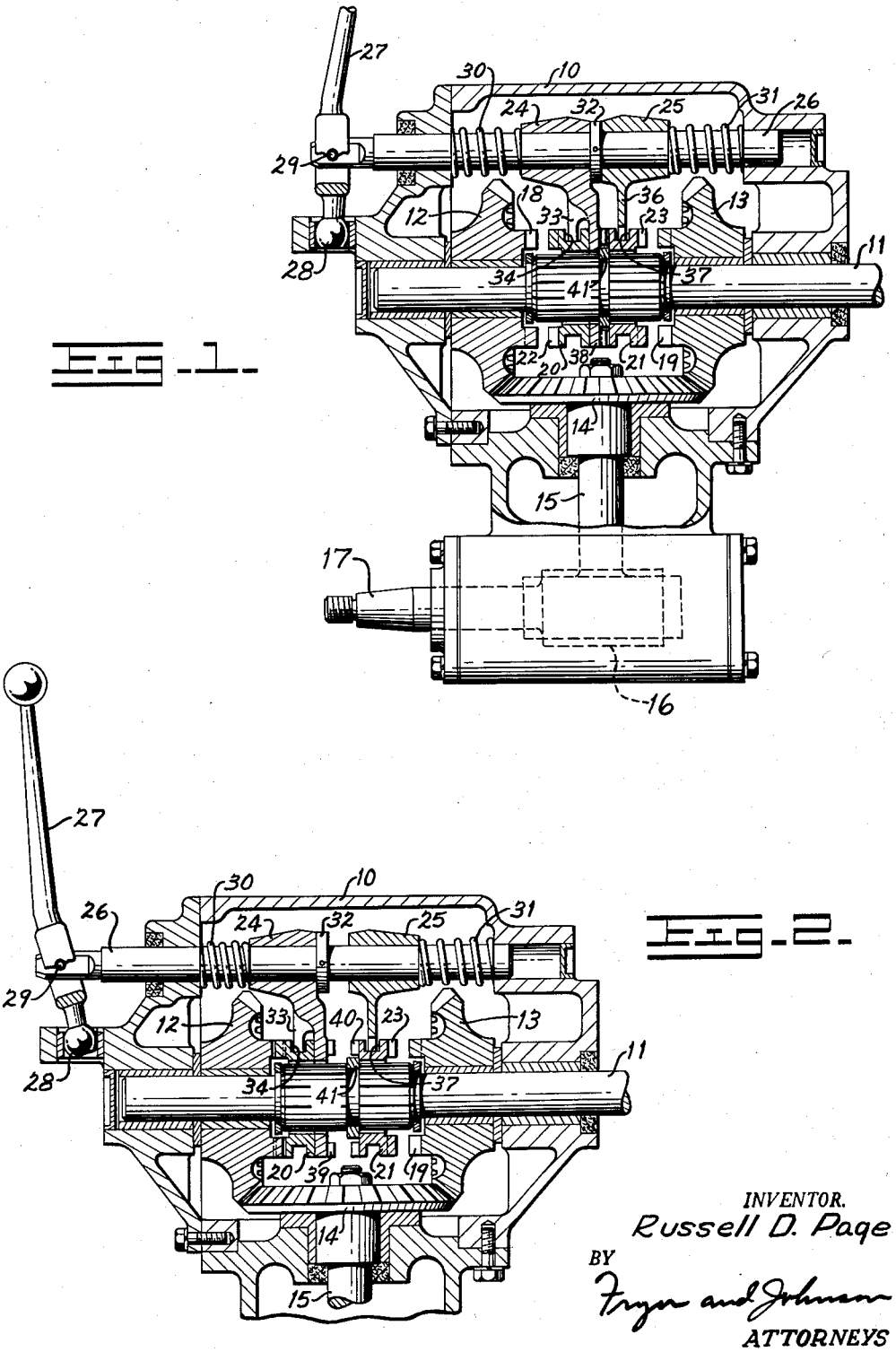

INVENTOR.
Russell D. Page
BY
Fryer and Johnson
ATTORNEYS

United States Patent Office 2,967,596
Patented Jan. 10, 1961

2,967,596

LOCKING MECHANISM FOR POWER TRANSMISSION

Russell D. Page, Decatur, Ill., assignor to Caterpillar Tractor Co., Peoria, Ill., a corporation of California Filed Jan. 5, 1959, Ser. No. 784,921

5 Claims. (Cl. 192—4)

This invention relates to locking mechanism for a power transmission mechanism to prevent rotation of the transmission driven shaft except when it is intentionally connected through the transmission with the input or drive shaft, and it relates particularly to means for providing a positive lock against rotation of the shaft as distinguished from friction braking means for this purpose which are old in the art, as evidenced by my assignee's patent to Smith 2,475,997, issued July 12, 1949.

The invention has been designed for use in connection with road grading machinery wherein various adjustments of the machine parts are effected by power taken from the prime mover of the machine and controlled by individual manually controlled transmissions. It will be apparent, however, as the description proceeds that the invention is not limited to use with road grading machinery, but is readily adaptable to transmissions employed for other purposes.

It is an object of the invention to provide locking means for use with a power transmission mechanism wherein positive holding of the transmission driven shaft or output shaft is effected automatically when the shaft is in neutral position and disabled automatically when the transmission is shifted to effect operation of the output shaft in either of two driving directions.

Further and more specific objects and advantages of the invention are made apparent in the following specification wherein reference is made to the accompanying drawings illustrating the invention in its preferred form.

In the drawings:

Fig. 1 is a central vertical sectional view through a transmission having a locking mechanism embodying the present invention;

Fig. 2 is a fragmentary view of the same transmission illustrating the parts in drive position for one direction of rotation;

Figure 3:
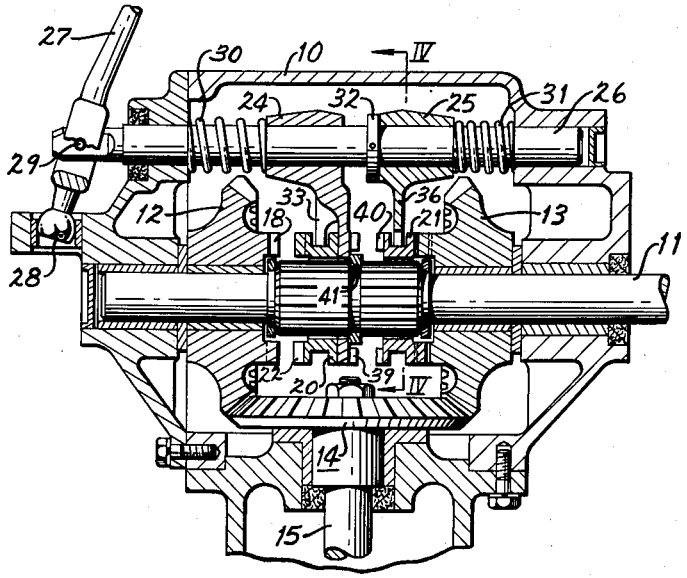
Fig. 3 is a similar view illustrating the parts in drive position for the opposite direction of rotation.

In Figs. 1 to 3 of the drawings a transmission housing of conventional design is illustrated at 10 as containing a driven shaft 11 suitably journaled for rotation in the housing and extending outwardly through one side of the housing as shown where it will in practice be connected with some part to be controlled. Such part, for example, may be the scraper blade or other controllable part on a road grading machine, and mechanism will be employed for example for raising of the blade upon rotation of the shaft 11 in one direction and lowering of the blade upon its rotation in the opposite direction.

Rotary movement is imparted to the output shaft 11 through either one of a pair of bevel gears 12 and 13 freely rotatable on the shaft and constantly driven in opposite directions by a meshing bevel 14. The gear 14 is carried on a stub shaft 15 which is connected, as by worm gearing shown in dotted lines at 16 in Fig. 1, with the drive shaft 17. The drive shaft 17 is connected with a suitable power take off shaft (not shown) of a diesel engine or other prime mover of the road grading machine.

As the bevel gears 12 and 13 are constantly driven in opposite directions, connection of either one or the other of these gears with the driven shaft 11 is effective to impart rotary motion to the driven shaft selectively in opposite directions. Each of the gears 12 and 13 is provided with a toothed clutch face as indicated at 18 and 19 respectively and a pair of clutch shifting collars 20 and 21 are slidably but non-rotatably carried by the driven shaft 11 through the medium of splined connections as shown. The clutch collars 20 and 21 are provided with toothed clutch faces 22 and 23 respectively for engagement with the clutch faces 18 and 19 of the gears 12 and 13.

In order to effect selective shifting of the clutch collars longitudinally of the shaft 11, a pair of shifting forks 24 and 25 are slidably mounted on a shifting rod 26 which extends through and is slidable with relation to the transmission housing 10. A manually operable lever 27 disposed exteriorly of the housing is arranged to be rocked about a pivotal connection 28 and is connected as by a pin 29 with the shifting rod 26. Springs 30 and 31 interposed between the inner walls of the housing and the shifting forks 24 and 25 respectively normally maintain the shifting forks in a central or neutral position where they abut a centrally disposed thrust collar 32 fixed on the shifting rod 26. In this central position, which is illustrated in Fig. 1, neither of the gears 12 or 13 is connected with the output shaft 11.

The shifting fork 24 has tines 33 (see Fig. 5) which engage in a groove 34 in the collar 20 and the shifting fork 25 has similar tines 36 which engage in a groove 37 in the collar 21.

With the construction thus far described, movement of the lever 27 toward the left as indicated in Fig. 2 shifts the collar 20 leftward until its clutch face 22 engages the clutch face 18 of the gear 12 thus imparting driving movement in one direction to the shaft 11 through the spline connection of the collar 20 therewith. Similarly movement of the lever 27 toward the right or to the position illustrated in Fig. 3, the clutch face of the collar 21 engages the clutch face of the gear 13 for imparting driving movement to the shaft 11 in the opposite direction.

Figure 4:
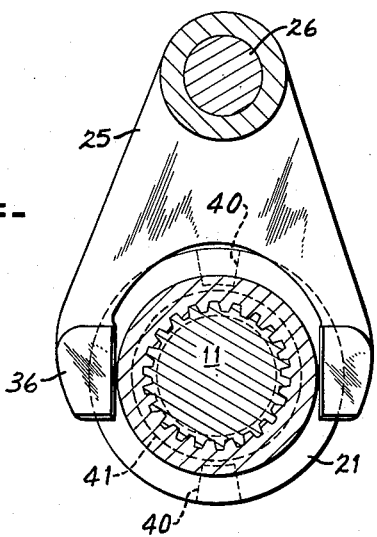
Fig. 4 is an enlarged sectional view taken on the line 4—4 of Fig. 3 illustrating the construction of one of a pair of shifting forks in the transmission.
Figure 5:
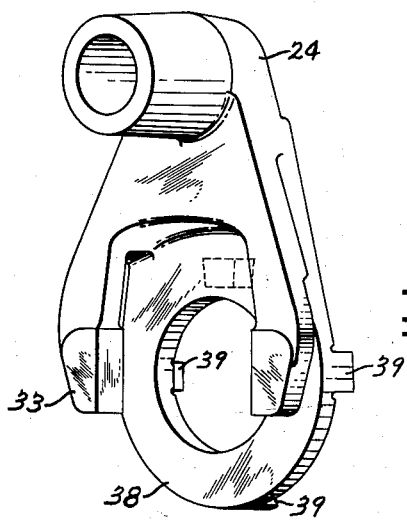
Fig. 5 is a perspective view of the other of said pair of shifting forks, showing the special locking mechanism associated therewith.

In accordance with the present invention and to prevent rotation of the shaft 11 by a positive locking action when the transmission is in neutral, the shifting fork 24 has, as best illustrated in Fig. 5, a downwardly depending member 38 with a central opening which embraces the shaft 11 and this member carries a plurality, shown as 4 in number, of locking dogs 39 projecting from one of its faces in an axial direction with respect to the shaft 11. The shifting collar 21 which is shown in Fig. 4, has a plurality of similar radially extending dogs 40 on its face adapted to engage between dogs 39 on the member 38. A snap ring 41 is disposed in a groove formed centrally of the spline portion upon which the collars 20 and 21 slide and provides a limit to the sliding movement of the collars toward each other.

When the shifting collars are centrally disposed in the neutral position illustrated in Fig. 1, the teeth 39 on the member 38 of the shifting fork 24 engage the teeth 40 on the shifting collar 21 and thus provide a positive lock against rotation of the shaft 11. Upon shifting in one direction, or to the left as shown in Fig. 2 the teeth 39 are withdrawn from their interlocking engagement with the teeth 40 and the shaft 11 is free to rotate. Correspondingly when the transmission is shifted toward the right, for rotation of the shaft 11 in the opposite direction as shown in Fig. 3, the teeth 40 of the shifting collar 21 are withdrawn from their interlocking engagement with the teeth 39 again permitting free rotation of the shaft 11. Thus, through simple mechanism the shaft 11 is automatically and positively locked against rotation when the transmission is in neutral and freed for rotation when the transmission is shifted for either forward or reverse operation.

I claim:

1. In a power transmission comprising a driven shaft, a pair of gears rotatable thereon, and a pair of grooved shifting collars between said gears rotatable with and slidable on said shaft, said gears and collars having interengaging clutch teeth thereon to effect a driving connection with either of said gears, a pair of shifting forks for sliding said collars, interengageable means on one fork and the other collar to prevent rotating the shaft when the collars are centrally positioned and to permit rotation thereof when either collar is moved into engagement with one of said gears.

2. In a power transmission which includes two shifting collars splined to a shaft for movement from a neutral position adjacent each other independently in opposite directions for selective driving engagement with gears which are rotatable on the shaft, said gears and collars having interengaging clutch teeth thereon, a shifting fork for each collar to impart such movement, and means on one shifting fork engageable with the collar of the other shifting fork to prevent rotation of the collars and the shaft in said neutral position said means comprising widely spaced dogs on said one shifting fork engageable with widely spaced dogs on said collar.

3. In a transmission having a housing, a rotatable driven shaft therein, two gears rotatable on said shaft, two shifting collars splined to the shaft between said gears and movable independently away from an adjacent neutral position into driving engagement with either of said gears to drive said shaft, said gears and collars having interengaging clutch teeth thereon, a shifting rod slidable in the housing parallel to said shaft, two shifting forks slidable on the rod and engaging one with each of said shifting collars, a fixed collar on the rod between said forks whereby sliding of the rod in either direction will move one of said forks and one shifting collar toward one of said gears, and means carried on the shaft to limit movement of the shifting collars toward each other.

4. In a transmission having a housing, a rotatable driven shaft therein, two gears rotatable on said shaft, two shifting collars splined to the shaft between said gears and movable independently away from an adjacent neutral position into driving engagement with either of said gears to drive said shaft, said gears and collars having interengaging clutch teeth thereon, a shifting rod slidable in the housing parallel to said shaft, two shifting forks slidable on the rod and engaging one with each of said shifting collars, a fixed collar on the rod between said forks whereby sliding of the rod in either direction will move one of said forks and one shifting collar toward one of said gears, resilient means between each shifting fork and the housing to return the fork and shifting collar toward neutral when the rod slides in the opposite direction, and means fixed to the shaft to limit such return movement of the collars.

5. In a transmission having a housing, a rotatable driven shaft therein, two gears rotatable on said shaft, two shifting collars splined to the shaft between said gears and movable independently away from an adjacent neutral position into driving engagement with either of said gears to drive said shaft, said gears and collars having interengaging clutch teeth thereon, a shifting rod slidable in the housing parallel to said shaft, two shifting forks slidable on the rod and engaging one with each of said shifting collars, a fixed collar on the rod between said forks whereby sliding of the rod in either direction will move one of said forks and one shifting collar toward one of said gears, resilient means between each shifting fork and the housing to return the fork and shifting collar toward neutral when the rod slides in the opposite direction, and means carried by one shifting fork and engageable with the collar actuated by the other fork to prevent rotation of the shifting collars and the shaft when the collars are in said neutral position.

References Cited in the file of this patent

UNITED STATES PATENTS 2,192,439     Gustafson _____ Mar. 5, 1940